(12) United States Patent
Yoon et al.

(10) Patent No.: US 12,362,426 B2
(45) Date of Patent: Jul. 15, 2025

(54) BATTERY PACK HAVING THERMAL DIFFUSION PREVENTION STRUCTURE BETWEEN BATTERY MODULES

(71) Applicant: LG ENERGY SOLUTION, LTD., Seoul (KR)

(72) Inventors: Doo-Han Yoon, Daejeon (KR); Chang-keun Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/637,591

(22) PCT Filed: Jun. 22, 2021

(86) PCT No.: PCT/KR2021/007837
§ 371 (c)(1),
(2) Date: Feb. 23, 2022

(87) PCT Pub. No.: WO2022/055088
PCT Pub. Date: Mar. 17, 2022

(65) Prior Publication Data
US 2024/0297394 A1    Sep. 5, 2024

(30) Foreign Application Priority Data

Sep. 10, 2020   (KR) .................. 10-2020-0116407

(51) Int. Cl.
*H01M 50/293* (2021.01)
*H01M 10/625* (2014.01)
(Continued)

(52) U.S. Cl.
CPC ..... *H01M 50/293* (2021.01); *H01M 10/6555* (2015.04); *H01M 10/658* (2015.04);
(Continued)

(58) Field of Classification Search
CPC ................................... H01M 10/6555
See application file for complete search history.

(56) References Cited

U.S. PATENT DOCUMENTS

| 2009/0061299 A1 | 3/2009 | Uchida et al. | |
| 2010/0136396 A1* | 6/2010 | Hermann | H01M 10/4207 429/99 |

(Continued)

FOREIGN PATENT DOCUMENTS

| CN | 101378141 A | 3/2009 |
| CN | 102488480 A | 5/2012 |

(Continued)

OTHER PUBLICATIONS

Extended European Search Report for European Application No. 21866959.6, dated Nov. 28, 2023.

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A battery pack includes a plurality of battery modules, each having a plurality of battery cells and a module housing for accommodating the plurality of battery cells; an insulator interposed between two battery modules facing each other among the plurality of battery modules; and an anti-compression member made of a rigid material and disposed such that both ends thereof are in contact with outer surfaces of the two battery modules facing each other through the insulator.

18 Claims, 6 Drawing Sheets

(51) Int. Cl.
  *H01M 10/6555* (2014.01)
  *H01M 10/658* (2014.01)
  *H01M 50/211* (2021.01)
  *H01M 50/242* (2021.01)
  *H01M 50/249* (2021.01)

(52) U.S. Cl.
  CPC ....... *H01M 50/211* (2021.01); *H01M 50/242* (2021.01); *H01M 10/625* (2015.04); *H01M 50/249* (2021.01)

(56) References Cited

U.S. PATENT DOCUMENTS

| | | | |
|---|---|---|---|
| 2010/0151309 A1* | 6/2010 | Marukawa | H01M 10/613 |
| | | | 429/120 |
| 2012/0028107 A1 | 2/2012 | Sugita et al. | |
| 2012/0219838 A1 | 8/2012 | Terada et al. | |
| 2014/0120391 A1 | 6/2014 | Park | |
| 2015/0280190 A1 | 10/2015 | Ohshiba et al. | |
| 2019/0013556 A1 | 1/2019 | Sakaguchi et al. | |
| 2019/0181399 A1 | 6/2019 | Kaga et al. | |
| 2020/0058912 A1 | 2/2020 | Kuramitsu et al. | |
| 2020/0136114 A1 | 4/2020 | Kondo et al. | |
| 2020/0161600 A1 | 5/2020 | Abe | |
| 2020/0287252 A1 | 9/2020 | Li et al. | |
| 2021/0351453 A1 | 11/2021 | Aota | |

FOREIGN PATENT DOCUMENTS

| | | | |
|---|---|---|---|
| CN | 102593390 A | | 7/2012 |
| CN | 105206895 A | | 12/2015 |
| CN | 205944158 U | | 2/2017 |
| CN | 111052437 A | | 4/2020 |
| CN | 111092178 A | | 5/2020 |
| CN | 111312951 A | | 6/2020 |
| CN | 111584979 A | | 8/2020 |
| CN | 111033879 A | | 5/2025 |
| JP | 2002-63947 A | | 2/2002 |
| JP | 2004-235110 A | | 8/2004 |
| JP | 3693983 B2 | | 9/2005 |
| JP | 2009277575 A | * | 11/2009 |
| JP | 2015-195136 A | | 11/2015 |
| JP | 2015-211013 A | | 11/2015 |
| JP | 2018-206605 A | | 12/2018 |
| JP | WO2017/159528 A1 | | 1/2019 |
| JP | WO2019/082509 A1 | | 9/2020 |
| JP | 2020-187869 A | | 11/2020 |
| KR | 10-2011-0126714 A | | 11/2011 |
| KR | 10-2016-0041411 A | | 4/2016 |
| KR | 10-1741289 B1 | | 5/2017 |
| KR | 10-2019-0082974 A | | 7/2019 |
| WO | WO2020/152923 A1 | | 7/2020 |

* cited by examiner

BATTERY PACK HAVING THERMAL DIFFUSION PREVENTION STRUCTURE BETWEEN BATTERY MODULES

TECHNICAL FIELD

The present disclosure relates to a battery pack including two or more battery modules, and more specifically, to a battery pack having a thermal diffusion prevention structure that may effectively block heat propagation to surrounding battery modules when one battery module is heated.

The present application claims priority to Korean Patent Application No. 10-2020-0116407 filed on Sep. 10, 2020 in the Republic of Korea, the disclosures of which are incorporated herein by reference.

BACKGROUND ART

A semi-permanent battery that converts electrical energy into chemical energy and allows repeated charging and discharging is called a secondary battery to be distinguished from a primary battery that cannot be reused after being used once.

Secondary batteries include lithium secondary batteries, nickel-cadmium (Ni—Cd) batteries, lead-acid batteries, nickel-hydrogen (Ni-MH) batteries, zinc air batteries, alkali manganese batteries, and the like. Among them, lead-acid batteries and lithium secondary batteries are the most actively commercialized secondary batteries.

In particular, the lithium secondary batteries are actively used as batteries for electric vehicles since they have advantages such as high energy storage density, light weight, miniaturization, excellent safety, low discharge rate, and long lifespan. For reference, the lithium secondary batteries are generally classified into cylindrical, rectangular, and pouch types according to their manufacturing type, and they are also used not only as batteries for electric vehicles but also as ESS batteries and batteries for other electric devices.

Currently, a sufficient output for drive an electric vehicle cannot be obtained by using just one lithium secondary battery (cell). In order to apply the secondary battery as an energy source for an electric vehicle, a battery module in which a plurality of lithium ion battery cells are connected in series and/or in parallel should be configured, and usually a battery pack including a BMS (Battery Management System) which connects the battery modules in series and maintains them functionally, a cooling system, a BDU (Battery Disconnection Unit), and electric wiring cables is configured.

Meanwhile, since the secondary battery accompanies chemical reactions during charging and discharging, performance may deteriorate when the secondary battery is used in an environment higher than an appropriate temperature, and there is a risk of ignition or explosion if the temperature rises seriously above an appropriate temperature. In the case of a battery module having a structure in which such secondary batteries are intensively accommodated inside a module housing, the heat from the secondary batteries may be added up to increase the temperature of the battery module faster and more severely.

Moreover, the battery pack includes a plurality of battery modules. Here, if an abnormal situation may occur in some of the battery modules or some of the secondary batteries of any battery module, heat may be generated to continuously increase the temperature of the corresponding battery module. If the temperature exceeds a predetermined critical temperature, other battery modules in the vicinity may also go into a thermal runaway situation. If such heat or thermal runaway situation is not properly controlled, it is impossible to properly guarantee the safety of the battery pack.

DISCLOSURE

Technical Problem

The present disclosure is designed to solve the problems of the related art, and therefore the present disclosure is directed to providing an insulating structure between battery modules, which may stably block thermal runaway propagation to surrounding battery modules when some of a plurality of battery modules are heated.

However, the object of the present disclosure are is limited to the above, and objects not mentioned herein may be clearly understood from the present specification and the accompanying drawings by those skilled in the art.

Technical Solution

In one aspect of the present disclosure, there is provided a battery pack, comprising: a plurality of battery modules, each of the plurality of battery modules having a plurality of battery cells and a module housing for accommodating the plurality of battery cells; an insulator interposed between two battery modules facing each other among the plurality of battery modules; and an anti-compression member made of a rigid material and disposed such that opposite ends thereof are in contact with respective outer surfaces of the two battery modules facing each other.

Each module housing may include a top plate and a bottom plate configured to form an upper portion and a lower portion of the module housing, respectively; and a pair of side plates configured to form a left side and a right side of the module housing, respectively, the plurality of battery cells may be pouch-type battery cells and arranged to be stacked such that broad surfaces of the plurality of battery cells are upright, the plurality of battery cells being accommodated in the module housing such that outermost battery cells among the plurality of battery cells are disposed to face the pair of side plates, respectively, and the insulator and the anti-compression member may be configured to contact the side plates of the two battery modules facing each other, respectively.

The two battery modules facing each other may include a first battery module and a second battery module, and the insulator may include a first insulating pad configured to contact a first side plate of the pair of side plates of the first battery module and at least a portion of the top plate of the first battery module; and a second insulating pad configured to contact a first side plate of the pair of side plates of the second battery module and at least a portion of the top plate of the second battery module.

The first insulating pad and the second insulating pad may be provided symmetrically.

Each of the first insulating pad and the second insulating pad may include a wall portion formed to have an area corresponding to the first side plate of a respective one of the two battery modules facing each other, and a bending portion bent at a top of the wall portion and disposed in parallel with the top plate of a respective one of the two battery modules facing each other.

The wall portion may have at least one perforation hole in a thickness direction, and the anti-compression member may be inserted and interposed in the at least one perforation hole.

The at least one perforation hole may be composed of three perforation holes, one of the three perforation holes may located at a center of the wall portion, and the remaining two of the three perforation holes may be located symmetrically on the left side and right side with respect to the center with a predetermined distance from the center.

The anti-compression member may include a first anti-compression member inserted into the wall portion of the first insulating pad; and a second anti-compression member inserted into the wall portion of the second insulating pad.

Each of the first anti-compression member and the second anti-compression member may be provided in a tube shape, which includes: an insertion restriction portion formed to have a diameter greater than a diameter of the perforation hole; and an insertion tube portion formed to have a diameter smaller than a diameter of the insertion restriction portion and disposed inside the perforation hole.

The insertion restriction portion of the first anti-compression member may be in contact with the side plate of the first battery module, and the insertion restriction portion of the second anti-compression member may be in contact with the side plate of the second battery module.

The insertion tube portion of the first anti-compression member and the insertion tube portion of the second anti-compression member may be configured such that ends thereof are in contact with each other.

The anti-compression member may be made of a ceramic fiber material.

The battery pack may further comprise a first thermal conductive sheet and a second thermal conductive sheet disposed between the first insulating pad and the second insulating pad; and a third insulating pad interposed between the first thermal conductive sheet and the second thermal conductive sheet.

The first thermal conductive sheet may include a first heat dissipation portion formed at a top thereof to extend in parallel with the top plate of the first battery module, and the second thermal conductive sheet may include a second heat dissipation portion at a top thereof to extend in parallel with the top plate of the second battery module.

The battery pack may further comprise a pack cover provided in contact with the first heat dissipation portion and the second heat dissipation portion to exchange heat therewith.

In another aspect of the present disclosure, there is also provided an electric vehicle, comprising the battery pack described above.

Advantageous Effects

According to an embodiment of the present disclosure, it is possible to stably block thermal runaway propagation between battery modules by preventing performance degradation of the insulating unit.

In other words, when the battery module is heated, the external shape of the module housing may change due to swelling of the secondary batteries therein. At this time, if an insulating unit is interposed between the battery modules, the insulating unit may be compressed, which may lower the heat blocking ability compared to the original insulating unit. However, the battery pack according to the present disclosure has a structure in which an anti-compression member capable of preventing the insulating unit from being compressed due to the swelling pressure of the battery module is applied between the battery modules together with the insulating unit, so that the propagation of thermal runaway between the battery modules may be blocked stably.

Therefore, according to this aspect of the present disclosure, the safety of the battery pack may be further improved.

The effects of the present disclosure are not limited to the above, and effects not mentioned herein may be clearly understood from the present specification and the accompanying drawings by those skilled in the art.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
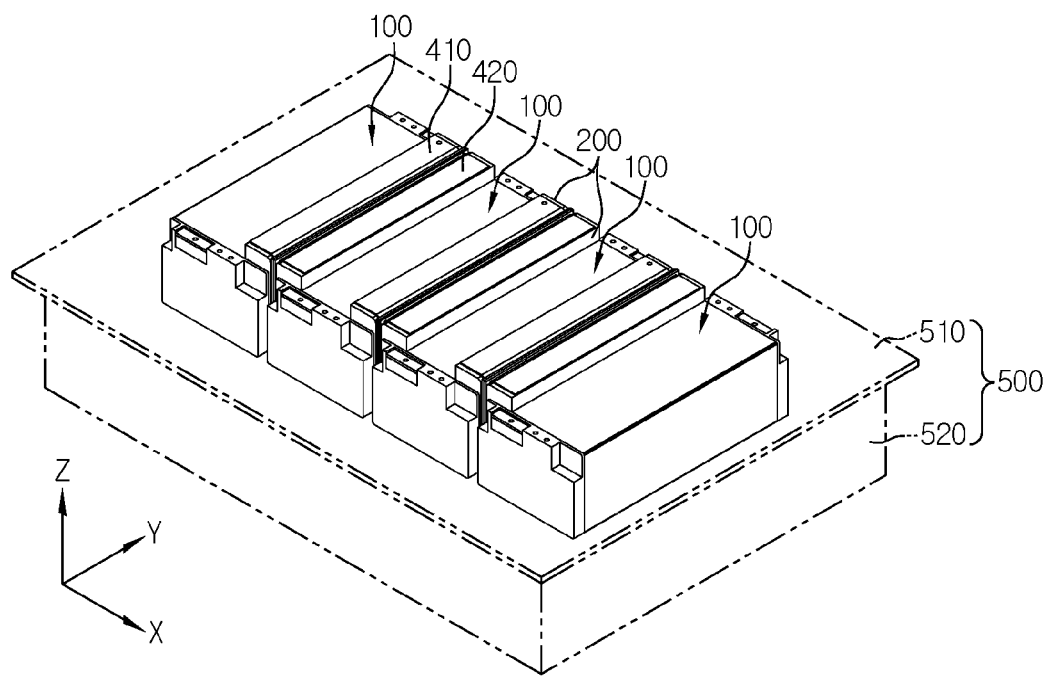
FIG. 1 is a diagram schematically showing a battery pack in which an insulating unit and an anti-compression member is applied between battery modules according to an embodiment of the present disclosure.
Figure 2:
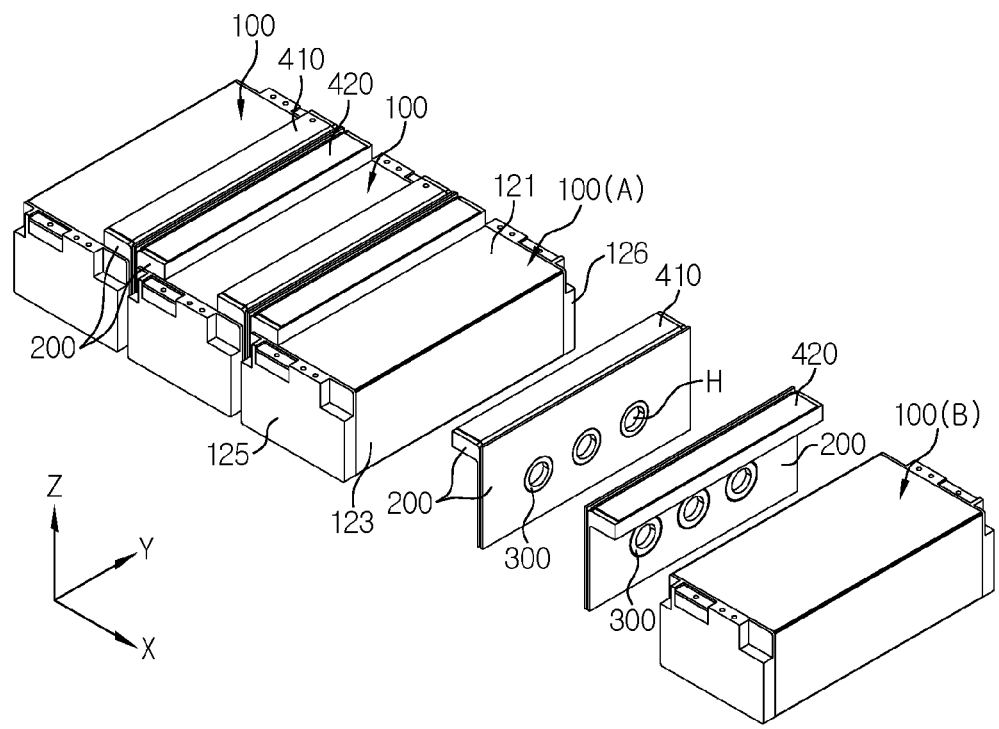
FIG. 2 is a diagram showing an arrangement for preventing thermal diffusion of the battery modules of FIG. 1.

FIG. 1 is a diagram schematically showing a battery pack in which an insulating unit and an anti-compression member is applied between battery modules according to an embodiment of the present disclosure, and FIG. 2 is a diagram showing an arrangement for preventing thermal diffusion of the battery modules of FIG. 1.

Referring to these drawings, the battery pack according to an embodiment of the present disclosure may include a plurality of battery modules 100, an insulating unit 200, an anti-compression member 300, thermal conductive sheets 410, 420, and a pack case 500.

The battery module 100 may include a plurality of battery cells 110. The battery cell 110 applied to this embodiment is a secondary battery, which is a pouch-type secondary battery, but the battery module 100 is not necessarily provided as a pouch-type secondary battery. That is, the battery module 100 may be configured as a cylindrical or rectangular secondary battery.

The secondary battery may have an electrode assembly, an electrolyte and an exterior. Here, the electrode assembly is an assembly of an electrode and a separator, and may be configured such that at least one positive electrode plate and at least one negative electrode plate are disposed with a separator interposed therebetween. In addition, each electrode plate of the electrode assembly may include an electrode tab to be connected to an electrode lead. In particular, in the case of a pouch-type secondary battery, at least one electrode tab may be connected to the electrode lead, and the electrode lead may be interposed between pouch exteriors to expose one end to the outside, thereby functioning as an electrode terminal. The exterior has an empty space therein to accommodate the electrode assembly and the electrolyte, and may be configured in a sealed form. The exterior may be made of a metal material in the case of a can-type secondary battery, and may be configured to include an external insulating layer, a metal layer, and an internal adhesive layer in the case of a pouch-type secondary battery.

The configuration of the secondary battery is obvious to those skilled in the art and thus will not be described in detail. In addition, the battery pack according to the present disclosure may adopt various kinds of secondary batteries known at the time of filing of this application.

The battery module 100 may include a module housing 120 to accommodate the battery cells 110. That is, the module housing 120 may be regarded as constituting an outer portion or outer surface of the battery module 100, and a plurality of battery cells 110 may be accommodated inside the module housing 120.

In this embodiment, the pouch-type battery cells 110 are accommodated in the module housing 120 to be stacked in an upright form in a left and right direction (±X-axis direction). In this case, an outermost battery cell 110 in the stacking arrangement may be disposed to face a pair of side plates 123, 124, explained later. According to this battery cell accommodation structure, the energy density of each battery module 100 may be maximized.

The module housing 120 may be formed in an approximately rectangular parallelepiped shape. The module housing 120 may include a top plate 121 and a bottom plate 122, which form an upper portion and a lower portion, respectively, as well as a right side plate 123 and a left side plate 124, which form a right side and a left side, respectively. In addition, the module housing 120 may be configured such that a front end and a rear end are open and a hollow is formed therein so that the battery cells 110 are accommodated therein. Also, the module housing 120 may be configured to include a front cover 125 for covering the front end and a rear cover 126 for covering the rear end. At least one of the front cover 125 and the rear cover 126 may include a module terminal.

The module housing 120 may be configured in a sealed form to protect the battery cells 110 accommodated therein against external physical and chemical factors. For example, as shown in FIG. 1, the module housing 120 may be configured to be closed at upper, lower, left, right, front and rear sides thereof so that upper, lower, left, right, front and rear sides of the battery cells 110 accommodated therein are not exposed to the outside. By such a configuration, the module housing 120 becomes a component forming the outer side with respect to one battery module 100, and may serve as a boundary that divides the outside and the inside of the battery module 100.

The module housing 120 may include a rigid material such as metal for securing mechanical rigidity and an electrically insulating material for securing electrical insulation outside and inside the battery module 100. In addition, the module housing 120 may be made of a variety of other materials or may further include other materials.

The plurality of battery modules 100 may be accommodated in the pack case 500 including a tray 520 and a pack cover 510 provided to be coupled with each other, as shown in FIG. 1. Although not shown for the convenience of the drawings, a BMS (Battery Management System), a cooling system, a BDU (Battery Disconnection Unit), an electric wiring cable, and the like may be further accommodated inside the pack case 500.

The plurality of battery modules 100 may be arranged in the left and right direction (±X-axis direction) in the tray 520 such that the side surfaces thereof face each other. That is, the plurality of battery modules 100 may be arranged in the left and right direction such that the right side plate 123 and the left side plate 124 face each other, respectively.

The insulating unit 200 may be interposed between the plurality of battery modules 100. For example, as shown in FIG. 2, the insulating unit 200 may be interposed between two battery modules 100 facing each other among all battery module 100 included in the battery pack. That is, when an N number of battery modules 100 are included in the battery pack and the N number of battery modules 100 are arranged in the left and right direction, an N−1 number of insulating units 200 may be provided and interposed between the battery modules 100, respectively.

The insulating unit 200 may be made of a material having high thermal insulation and heat resistance. For example, a material such as foamed polystyrene or phenolic foam may be used to manufacture the insulating unit. The insulating unit may play a role of preventing heat generated from the battery module 100 from leaking out or preventing heat from flowing into the battery module 100 from the outside.

Therefore, even if some of the battery modules 100 included in the battery pack generate heat, the propagation of heat to other battery modules 100 therearound may be blocked or significantly delayed.

Meanwhile, as the battery pack continues to be used, a swelling phenomenon may occur in the battery cell 110 included in the battery module 100. Due to this swelling phenomenon of the battery cell 110, the battery module 100 may expand partially. At this time, when the insulating unit 200 between the battery modules 100 is compressed, the thermal blocking ability of the insulating unit 200 may be significantly reduced. In other words, since the ordinary insulating unit 200 has a porous structure that uses the insulating properties of air in the pores, when the insulating unit 200 is compressed, the porous structure may be broken to reduce the heat blocking ability.

Accordingly, the battery pack of the present disclosure further includes an anti-compression member 300 as a component for preventing the insulating unit 200 from being compressed due to the partial expansion of the battery module 100.

The anti-compression member 300 may be made of a rigid material and may be configured such that both ends of the anti-compression member 300 are in contact with the outer surfaces of the two battery modules 100 facing each other through the insulating unit 200.

Specifically, an example in which the insulating unit 200 and the anti-compression member 300 are applied together between the battery modules 100 according to an embodiment of the present disclosure will be described in detail with reference to FIGS. 3 to 5 along with FIG. 2.

Hereinafter, for convenience of explanation, two battery modules 100 adjacently facing each other are randomly selected from the battery modules 100 included in the battery pack, so that a battery module at a left side will be referred to as a first battery module 100A and a battery module at a right side will be referred to as a second battery module 100B.

Figure 3:
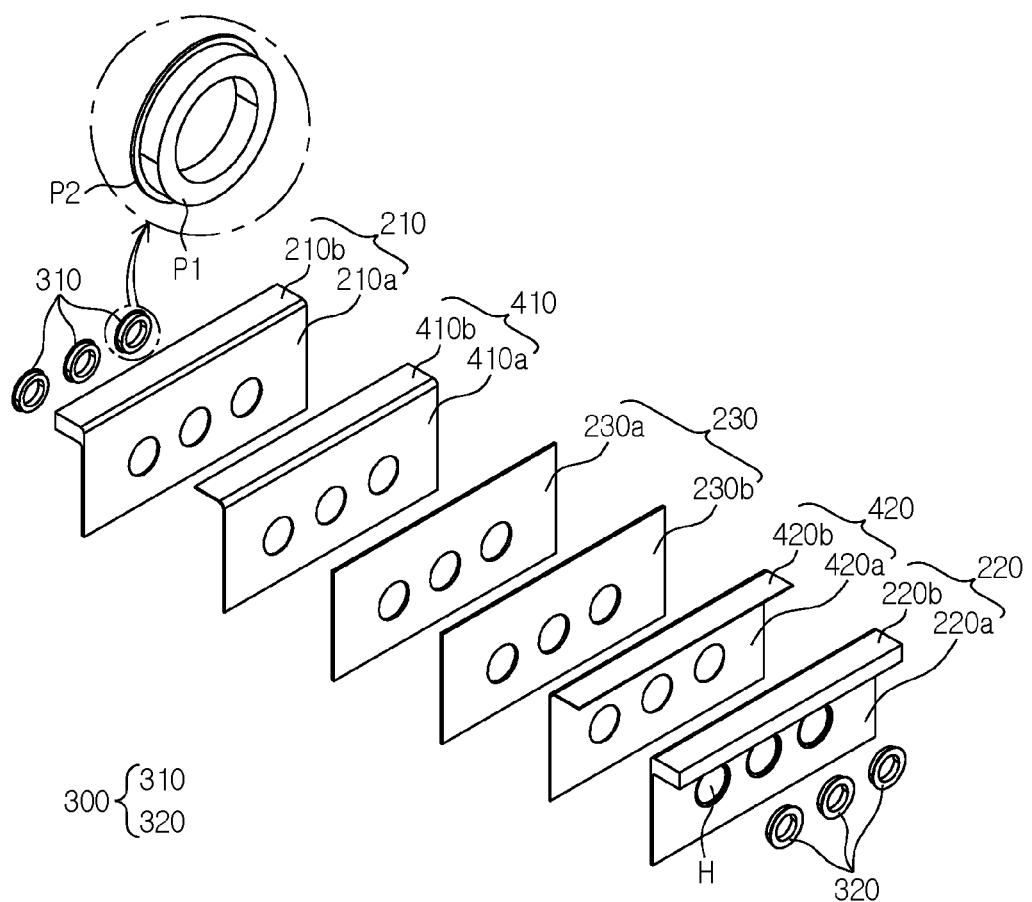
FIG. 3 is an exploded perspective view showing the insulating unit, the anti-compression member the thermal conductive sheet according to an embodiment of the present disclosure.
Figure 4:
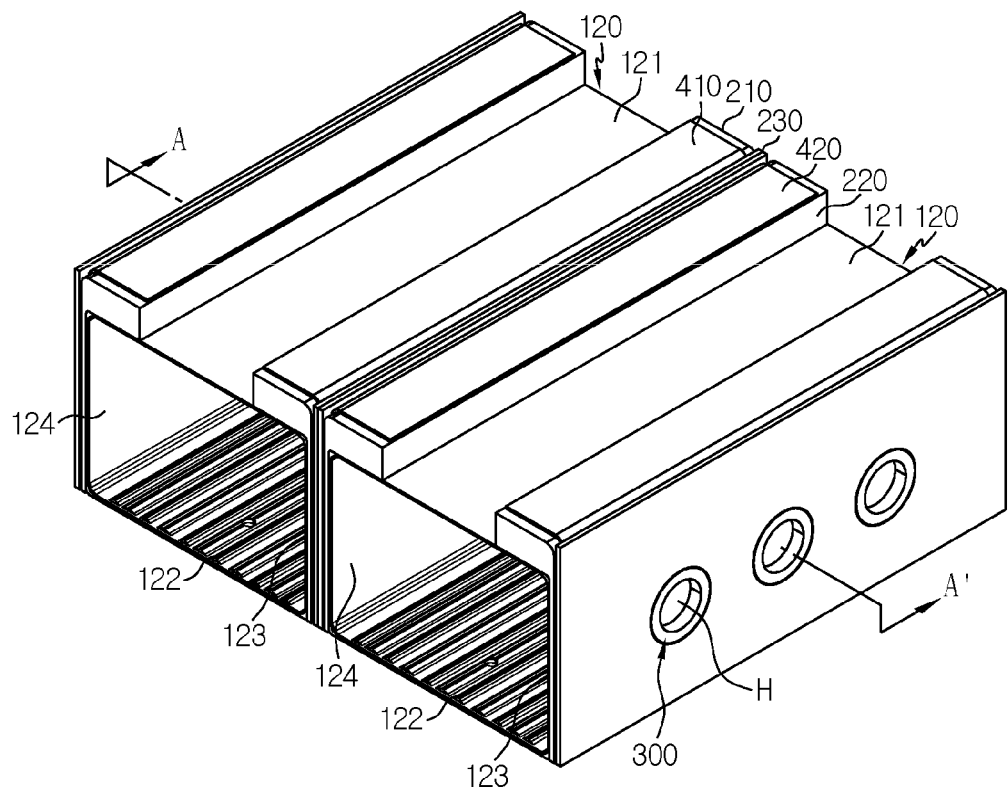
FIG. 4 is a perspective view showing that the module housing of the battery module according to an embodiment of the present disclosure is assembled with the insulating unit, the anti-compression member and the thermal conductive sheet.

First, referring to FIGS. 2 to 4, the insulating unit 200 may include a first insulating pad 210 configured to cover the entire right side plate 123 and at least a portion of the top plate 121 of the first battery module 100A and a second insulating pad 220 configured to cover the entire left side plate 124 and at least a portion of the top plate 121 of the second battery module 100B. The first insulating pad 210 and the second insulating pad 220 may be provided symmetrically to each other.

The first insulating pad 210 and the second insulating pad 220 may include wall bodies 210a, 220a formed to have an area corresponding to the side plates 123, 124, respectively, and bending portions 210b, 220b bent at the upper end of the wall portion 210a, 220a and disposed in parallel with the top plate 121.

According to the configuration of the wall bodies 210a, 220a and the bending portions 210b, 220b, it is possible to block the heat from flowing to the inside or the outside through the entire side plates 123, 124 and a corner area where the side plates 123, 124 connect to the top plate 121.

In addition, the bending portions 210b, 220b may be disposed on the top plate 121, and the bending portions 210b, 220b may be provided to be thicker than the wall bodies 210a, 220a. The bending portions 210b, 220b may serve as a buffering material for protecting the battery module 100 from vibration or shock that may be transmitted from the pack cover 510.

Also, since the bending portions 210b, 220b are provided at upper portions of the first insulating pad 210 and the second insulating pad 220, when the first insulating pad 210 and the second insulating pad 220 are interposed between the battery modules 100, the first insulating pad 210 and the second insulating pad 220 may be placed on the left top portion and the right top portion of the battery module 100, respectively. This works as an advantage in terms of assembly convenience since the first insulating pad 210 placed on the first battery module 100A and the second insulating pad 220 placed on the second battery module 100B during the assembly process may be easily adhered to each other.

The wall portion 210a of the first insulating pad 210 and the wall portion 220a of the second insulating pad 220 may include at least one perforation hole H penetrated in the thickness direction. For example, as shown in FIG. 3, the wall bodies 210a, 220a respectively have three perforation holes H, so that one of the perforation holes H is located in the center of the wall bodies 210a, 220a and the remaining two of the perforation holes H are located one by one symmetrically on the left side right sides with respect to the center with a predetermined distance from the center. The positions of the three perforation holes H may correspond to the central regions of the side plates 123, 124.

Three anti-compression bodies 300 may be provided, and each anti-compression member 300 may be inserted to pass through the perforation hole H. The anti-compression member 300 may be disposed such that, when the insulating unit 200 is interposed between the first battery module 100A and the second battery module 100B, one end of the anti-compression member 300 is disposed in contact with the right side plate 123 of the first battery module 100A at the outside of the first insulating pad 210 and the other end of the anti-compression member 300 is disposed in contact with the left side plate 124 of the second battery module 100B at the outside of the second insulating pad 220.

The anti-compression member 300 may be made of a rigid material sufficient to withstand the expansion force of the battery module 100. For example, the anti-compression member 300 may be made of a ceramic fiber material by performing vacuum forming into a pipe or tube shape and then a curing process.

Referring to FIG. 3 again, the anti-compression member 300 of this embodiment may include a first anti-compression member 310 and a second anti-compression member 320, so that the first anti-compression member 310 is inserted into the wall portion 210a of the first insulating pad 210 and the second anti-compression member 320 is inserted into the wall portion 220a of the second insulating pad 220.

Each of the first anti-compression member 310 and the second anti-compression member 320 may include an insertion restriction portion P2 and an insertion tube portion P1, and may be provided in a substantially tube or short pipe shape. The insertion restriction portion P2 may have a larger diameter than the perforation hole H of the wall bodies 210a, 220a, and the insertion tube portion P1 may be provided to have a smaller diameter than the perforation hole H of the wall bodies 210a, 220a.

The first anti-compression member 310 may be inserted into the perforation hole H of the first insulating pad 210 from left to right, and the second anti-compression member 320 may be inserted into the perforation hole H of the second insulating pad 220 from right to left. The insertion tube portion P1 of the first anti-compression member 310 and the insertion tube portion P1 of the second anti-compression member 320 inserted as above may pass through the first insulating pad 210 and the second insulating pad 220, respectively, so that their ends may contact each other. At this time, an adhesive tape or the like may be attached to an end of any one of the insertion tube portions P1 such that the insertion tube portions P1 are not easily separated.

In the first insulating pad 210 and the second insulating pad 220, the periphery of the perforation hole H may be recessed as much as the thickness of the insertion restriction portion P2, respectively. In this case, when the first anti-compression member 310 and the second anti-compression member 320 are inserted into the first insulating pad 210 and the second insulating pad 220, respectively, the insertion restriction portion P2 of the first anti-compression member 310 may not protrude from one surface of the first insulating pad 210, and the insertion restriction portion P2 of the second anti-compression member 320 may not protrude from one surface of the second insulating pad 220.

If the insulating unit 200 and the anti-compression member 300 are interposed between the first battery module 100A and the second battery module 100B (see FIG. 5) using the above configuration, one surface of the first insulating pad 210 and the insertion restriction portion P2 of the first anti-compression member 310 may be in contact with the right side plate 123 of the first battery module 100A without a step, and similarly, one surface of the second insulating pad 220 and the insertion restriction portion P2 of the second anti-compression member 320 may be in contact with the left side plate 124 of the second battery module 100B without a step.

The battery pack according to an embodiment of the present disclosure may further include a first thermal conductive sheet 410 and a second thermal conductive sheet 420 interposed between the first insulating pad 210 and the second insulating pad 220, and a third insulating pad 230 interposed between the first thermal conductive sheet 410 and the second thermal conductive sheet 420.

That is, referring to FIG. 3 again, the first thermal conductive sheet 410, the third insulating pad 230, and the second thermal conductive sheet 420 may be further added between the first insulating pad 210 and the second insulating pad 220 in the order from left to right. The first thermal conductive sheet 410, the third insulating pad 230, and the second thermal conductive sheet 420 may also have perforation holes H for inserting the anti-compression member 300.

The third insulating pad 230 may be provided with two sheets. The first insulating pad 210, the first thermal conductive sheet 410, and one sheet of the third insulating pad 230a may be connected to the first anti-compression member 310 to form a set of assembly, and the second insulating pad 220, the second thermal conductive sheet 420, and the other sheet of the third insulating pad 230b may be connected to the second anti-compression member 320 to form another set of assembly.

Two assemblies (see FIG. 2) are prepared as above so that one assembly is mounted at the right side of the first battery module 100A and the other assembly is mounted at the left side of the second battery module 100B, and then the insulating units 200, the anti-compression member 300, and the thermal conductive sheets are integrally interposed between the battery modules 100 so that the first battery module 100A and the second battery module 100B are in close contact with each other. In this case, the assembly operation may be performed efficiently and quickly.

Meanwhile, the first thermal conductive sheet 410 and the second thermal conductive sheet 420 are components for quickly dissipating heat passing through the first insulating pad 210 or the second insulating pad 220 to the outside, and may be made of a material such as aluminum or graphite with excellent thermal conductivity.

Figure 5:
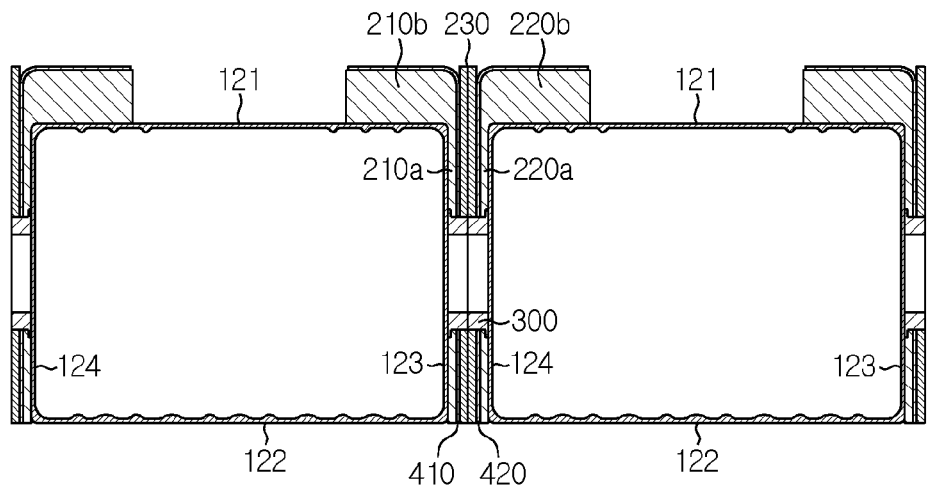
FIG. 5 is a sectional view, taken along the line A-A' of FIG. 4.
Figure 6:
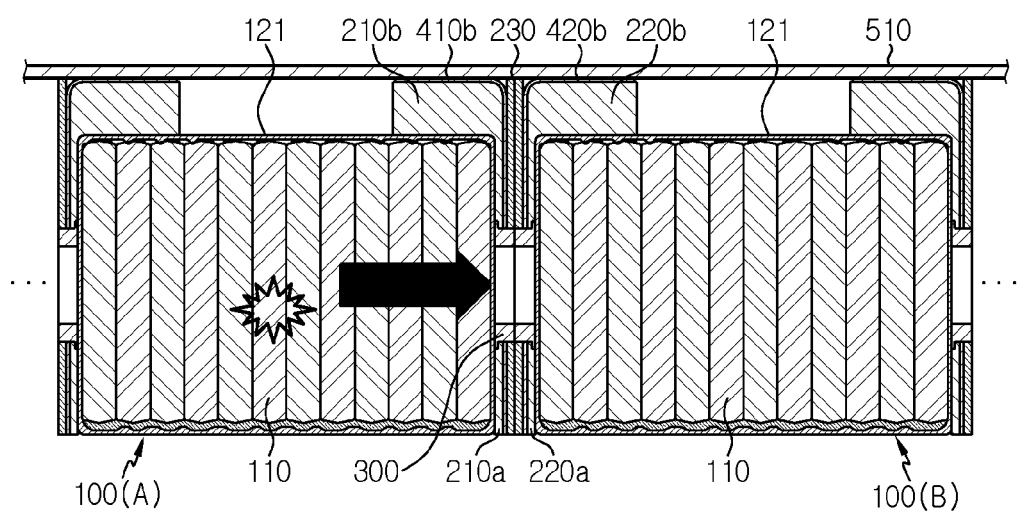
FIG. 6 is a diagram for illustrating an insulation and heat-dissipation structure between the battery modules of the battery pack according to an embodiment of the present disclosure.

Referring to FIGS. 3 and 5 to 6, the first thermal conductive sheet 410 includes a first heat absorbing portion 410a provided in surface contact with the wall portion 210a of the first insulating pad 210, and a first heat dissipation portion 410b bent at the top of the first heat absorbing portion 410a to extend in parallel with the bending portion 210b of the first insulating pad 210 or the top plate 121 of the first battery module 100A. An upper surface of the first heat dissipation portion 410b may be disposed in contact with an inner surface of the pack cover 510 as shown in FIG. 6.

The first thermal conductive sheet 410 may act to quickly disperse the heat source propagating to the right beyond the first insulating pad 210 to the pack cover 510 so that the heat does not move toward the second battery module 100B. Here, the pack cover 510 is a structure with a relatively large thermal capacity compared to the first battery module 100A, and thus may sufficiently absorb the heat of the first thermal conductive sheet 410.

The second thermal conductive sheet 420 includes a second heat absorbing portion 420a provided in surface contact with the wall portion 220a of the second insulating pad 220, and a second heat dissipation portion 420b bent at the top of the second heat absorbing portion 420a to extend in parallel with the bending portion 220b of the second insulating pad 220 or the top plate 121 of the second battery module 100B. The second heat dissipation portion 420b may be disposed in contact with the inner surface of the pack cover 510, similarly to the first heat dissipation portion 410b.

The second thermal conductive sheet 420 may act similar to the first thermal conductive sheet 410. That is, the second thermal conductive sheet 420 may act to disperse the heat source propagating to the left beyond the second insulating pad 220 to the pack cover 510 so that the heat does not move toward the first battery module 100A.

In addition, since the third insulating pad 230 is interposed between the first thermal conductive sheet 410 and the second thermal conductive sheet 420, it is possible to block the movement of heat between the first thermal conductive sheet 410 and the second thermal conductive sheet 420. Also, even if the heat source moves in the left or right direction beyond the third insulating pad 230, the heat may be quickly dissipated to the pack cover 510 by the first thermal conductive sheet 410 or the second thermal conductive sheet 420.

Therefore, according to the configuration, for example, even if a problem occurs in any battery cell 110 inside the first battery module 100A as shown in FIG. 6 so the first battery module 100A is heated severely or fired, it is possible to more effectively block the movement of the heat source to the second battery module 100B.

Figure 7:
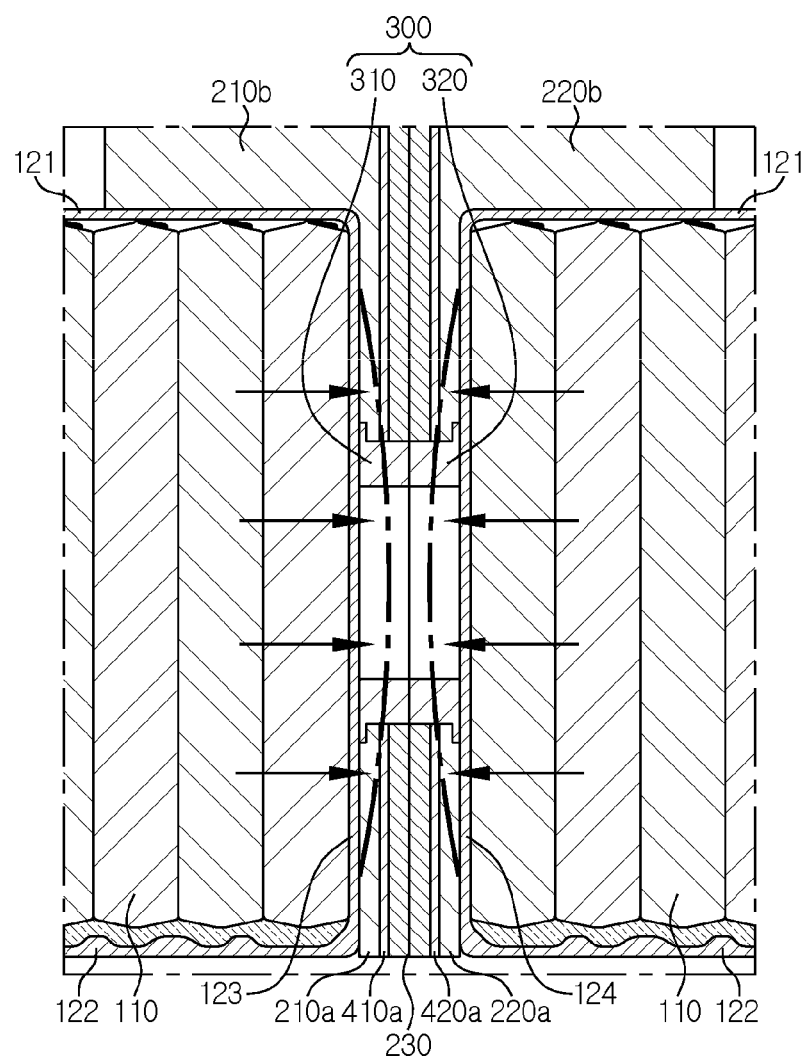
FIG. 7 is an enlarged view showing a main part of FIG. 6.

Also, referring to FIG. 7, as described above, when swelling occurs at the battery cells 110 inside the first battery module 100A or the second battery module 100B, the anti-compression member 300 acts to support the right side plate 123 of the first battery module 100A and the left side plate 124 of the second battery module 100B so that the insulating units 200 are not compressed. In this case, since the first insulating pad 210, the second insulating pad 220, and the third insulating pad 230 described above may fully exhibit their original insulating function, when the first battery module 100A is heated as an example, it is possible to reliably block the heat so that the thermal runaway phenomenon does not propagate to the second battery module 100B.

Meanwhile, the battery pack according to the present disclosure may be applied to a vehicle such as an electric vehicle or a hybrid electric vehicle. That is, the vehicle according to the present disclosure may include the battery pack according to the present disclosure. In particular, in the case of an electric vehicle or the like, the battery pack may contain many secondary batteries. Here, according to the present disclosure, even if any secondary battery generates heat, it is possible to effectively block the propagation of the thermal runaway phenomenon the battery module 100 to which the secondary battery belongs to other surrounding battery modules 100.

In the battery pack configured as above, when an event such as heat or flame occurs in a specific battery module 100, thermal runaway to the surrounding battery modules 100 may be blocked or sufficiently delayed, so it is possible to secure time required for taking measures for user safety and prevention of secondary accidents.

Meanwhile, the terms indicating up, down, left, right, front and rear directions are used in the specification, but these terms are just for convenience of explanation, and it is obvious to those skilled in the art that they can vary based on a location of an object or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
a plurality of battery modules, each of the plurality of battery modules having a plurality of battery cells and a module housing for accommodating the plurality of battery cells;
an insulator interposed between two battery modules facing each other among the plurality of battery modules; and
an anti-compression member disposed such that opposite ends thereof are in contact with respective outer surfaces of the two battery modules facing each other,
wherein the two battery modules facing each other include a first battery module and a second battery module, and
wherein the insulator includes:
a first insulating pad configured to contact a first side plate of the pair of side plates of the first battery module and at least a portion of the top plate of the first battery module; and
a second insulating pad configured to contact a first side plate of the pair of side plates of the second battery module and at least a portion of the top plate of the second battery module.

2. The battery pack according to claim 1, wherein the first insulating pad and the second insulating pad are provided symmetrically.

3. The battery pack according to claim 2, wherein each of the first insulating pad and the second insulating pad includes a wall portion formed to have an area corresponding to the first side plate of a respective one of the two battery modules facing each other, and a bending portion bent at a top of the wall portion and disposed in parallel with the top plate of a respective one of the two battery modules facing each other.

4. The battery pack according to claim 3, wherein the wall portion has at least one perforation hole in a thickness direction, and
wherein the anti-compression member is inserted and interposed in the at least one perforation hole.

5. The battery pack according to claim 4, wherein the at least one perforation hole is composed of three perforation holes, and
wherein one of the three perforation holes is located at a center of the wall portion, and the remaining two of the three perforation holes are located symmetrically on the left side and right side with respect to the center with a predetermined distance from the center.

6. The battery pack according to claim 4, wherein the anti-compression member includes:
a first anti-compression member inserted into the wall portion of the first insulating pad; and
a second anti-compression member inserted into the wall portion of the second insulating pad.

7. The battery pack according to claim 6, wherein each of the first anti-compression member and the second anti-compression member is provided in a tube shape including:
an insertion restriction portion formed to have a diameter greater than a diameter of the perforation hole; and
an insertion tube portion formed to have a diameter smaller than a diameter of the insertion restriction portion and disposed inside the perforation hole.

8. The battery pack according to claim 7, wherein the insertion restriction portion of the first anti-compression member is in contact with the first side plate of the first battery module, and the insertion restriction portion of the second anti-compression member is in contact with the first side plate of the second battery module.

9. The battery pack according to claim 7, wherein the insertion tube portion of the first anti-compression member and the insertion tube portion of the second anti-compression member are configured such that ends thereof are in contact with each other.

10. The battery pack according to claim 2, further comprising:
a first thermal conductive sheet and a second thermal conductive sheet disposed between the first insulating pad and the second insulating pad; and
a third insulating pad interposed between the first thermal conductive sheet and the second thermal conductive sheet.

11. The battery pack according to claim 10, wherein the first thermal conductive sheet includes a first heat dissipation portion formed at a top thereof to extend in parallel with the top plate of the first battery module, and
wherein the second thermal conductive sheet includes a second heat dissipation portion at a top thereof to extend in parallel with the top plate of the second battery module.

12. The battery pack according to claim 11, further comprising:
a pack cover provided in contact with the first heat dissipation portion and the second heat dissipation portion to exchange heat therewith.

13. The battery pack according to claim 1, wherein the anti-compression member is made of a ceramic fiber material.

14. A vehicle, comprising the battery pack according to claim 1.

15. The battery pack according to claim 1, wherein a rigidity of a material of the anti-compression member is greater than a rigidity a material of the insulator.

16. The battery pack according to claim 1, wherein the anti-compression member is embedded in the insulator.

17. The battery pack according to claim 1, wherein the anti-compression member is tube shaped.

18. The battery pack according to claim 1, wherein a perimeter of the anti-compression member is surrounded by the insulator.

* * * * *